United States Patent
Chumbley et al.

(10) Patent No.: US 9,146,735 B2
(45) Date of Patent: Sep. 29, 2015

(54) ASSOCIATING WORKFLOWS WITH CODE SECTIONS IN A DOCUMENT CONTROL SYSTEM

(75) Inventors: Robert B. Chumbley, Round Rock, TX (US); Jacob D. Eisinger, Austin, TX (US); Travis M. Grigsby, Austin, TX (US); Christopher M. Laffoon, Durham, NC (US); Rohan U. Mandrekar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1448 days.

(21) Appl. No.: 12/507,992

(22) Filed: Jul. 23, 2009

(65) Prior Publication Data

US 2011/0023007 A1 Jan. 27, 2011

(51) Int. Cl.
*G06F 9/44* (2006.01)
(52) U.S. Cl.
CPC ... *G06F 8/71* (2013.01); *G06F 8/73* (2013.01)
(58) Field of Classification Search
None
See application file for complete search history.

(56) References Cited

U.S. PATENT DOCUMENTS

| | | | |
|---|---|---|---|
| 6,928,328 B2* | 8/2005 | Deitz et al. | 700/87 |
| 7,058,582 B2* | 6/2006 | Powell | 705/1.1 |
| 7,076,312 B2* | 7/2006 | Law et al. | 700/23 |
| 7,437,712 B1* | 10/2008 | Brown et al. | 717/122 |
| 7,899,833 B2* | 3/2011 | Stevens et al. | 707/754 |
| 2003/0145281 A1 | 7/2003 | Thames | |
| 2003/0212718 A1* | 11/2003 | Tester | 707/203 |
| 2005/0039166 A1* | 2/2005 | Betts et al. | 717/114 |
| 2008/0052671 A1* | 2/2008 | Plante et al. | 717/114 |
| 2008/0059942 A1* | 3/2008 | Brown et al. | 717/101 |
| 2008/0059977 A1* | 3/2008 | Brown et al. | 719/316 |
| 2008/0235661 A1* | 9/2008 | Arpana et al. | 717/116 |
| 2012/0102456 A1* | 4/2012 | Paulheim et al. | 717/116 |

* cited by examiner

*Primary Examiner* — Ryan Coyer
*Assistant Examiner* — Evral Bodden
(74) *Attorney, Agent, or Firm* — Russell Ng PLLC; Jill Poimboeuf (57) ABSTRACT

Systems, methods, and articles of manufacture for facilitating workflow control for a document. In one embodiment, a portion of computer program source code is associated with a workflow. The computer program is monitored for reference to or by the portion of the computer program source code. In response to a reference to or by the computer program source code, the workflow is fired off.

17 Claims, 4 Drawing Sheets

```
/**
Java Method
* . . .
@authorized janedoe@us.ibm.com
@authorized DevGroupAlpha
*/
public double[] methodFoo(int argumentOne, String argumentTwo)
{
```

FIG. 5

ASSOCIATING WORKFLOWS WITH CODE SECTIONS IN A DOCUMENT CONTROL SYSTEM

BACKGROUND

1. Technical Field

Embodiments of the invention disclosed generally relate to systems, articles of manufacture, and associated methods for associating workflow(s) with a referenced or referencing portion of a document in a document control system.

2. Description of the Related Art

In general terms, version control pertains to the management of multiple versions of a document. As used here, the term "document" includes a computer file having computer program source code ("code"), which is to be understood as a set of instructions for use with a computing device. Version control is also known as revision control. A system that facilitates revision control is sometimes referred to as a version control system (VCS). In the field of computer programming or software development, sometimes the term "code versioning system" (CVS) or the term "source code management system" is also used in reference to a revision control system. Concurrent Versions System or Concurrent Versioning System (also abbreviated as CVS) is an open-source revision control application known in the relevant technology. To avoid confusion, the term "CVS" will not be used here. Instead, the term "VCS" will be used here to refer to a generic system commonly used to manage ongoing development of digital documents like application source code and other projects that may be worked on by a team.

Tools for revision control are increasingly recognized as necessary for organizing multi-developer projects. A VCS can be a stand-alone application, but a VCS can also be embedded in various types of software applications such word processors (for example, Microsoft Word, OpenOffice.org Writer, Pages, Google Docs), spreadsheets (for example, OpenOffice.org Calc, Google Spreadsheets, Microsoft Excel), and in various content management systems. In the context of software development, typically code is uploaded to a repository hosted or managed by a server computer. Authorized developers can access the code repository and make revisions to a file. The VCS system is configured to manage the developer's access to the files.

SUMMARY OF ILLUSTRATIVE EMBODIMENTS

Systems, methods, and articles of manufacture for facilitating workflow control for a document. In one embodiment, a portion of computer program source code is associated with a workflow. The computer program is monitored for reference to or by the portion of the computer program source code. In response to a reference to or by the computer program source code, the workflow is fired off.

In one aspect, a method of providing version control for computer program source code is provided. The method includes annotating a portion of the computer program source code to indicate at least one authorization for revisions to a section of the computer program source code. The method further includes monitoring the computer program for revisions to the portion of the computer program source code. The method can also include evaluating the at least one authorization to determine whether there is an authorization for a revision to the portion of the computer program source code, in response to a request to commit the revision. The method can also include, allowing the commit of the revision to the portion of the computer program source code, in response to a determination that there is authorization for the revision. In some embodiments, annotations can also be used to generate workflows indicating whether a commit has been attempted, been successful, or failed. The workflow can be, for example, an email delivery to an email address indicated in the annotations.

In another aspect, a version control system (VCS) includes a data processing system having a processor and a computer program storage. The VCS further includes an annotated computer program stored in the computer program storage, wherein the annotated computer program includes annotations associated with a portion of the computer program, the annotations indicative of at least one authorization for revisions to the portion of the computer program. In some implementations, the VCS also is provided with computer logic accessible and executable by the processor, the computer logic having instructions for: (a) monitoring the computer program for revisions to the portion of the computer program, (b) in response to a request to commit a revision to the portion of the computer program, evaluating the at least one authorization to determine whether there is an authorization for the revision, and (c) in response to a determination that there is authorization for the revision, allowing the commit of the revision to the portion of the computer program.

DETAILED DESCRIPTION OF ILLUSTRATIVE EMBODIMENTS

Disclosed are systems, methods, and articles of manufacture for facilitating association of a workflow with a portion of the computer program source code, for example, by code annotation. The method further includes monitoring the computer program for reference to or by the portion of computer program source code. The method can also include evaluating the reference to determine whether a workflow associated with the referenced portion of the computer program source code and/or the referencing portion of the computer program source code should be initiated in response to the reference. The workflow can implement, for example, allowing or revoking commitment of a revision to the portion of the computer program source code, in response to a determination regarding whether there is authorization for the revision. Alternatively or additionally, the workflow could include automatically regenerating code within the computer program source code, updating an issue tracking system, updating a business dashboard, etc.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided only to aid in the description and not meant to imply any limitations (structural or functional) on the invention. It is understood that the use of specific component, device and/or parameter names are exemplary only and not meant to imply any limitations on the invention. The invention may thus be implemented with different nomenclature or terminology used to describe the components, devices, or parameters herein, without limitation. Each term used herein is to be given its broadest interpretation given the context in which that terms is used.

As used here, the word "or" is generally used in the sense of "and/or". That is, the use of "or" in a list, for example, is not used in the exclusive sense. Hence, in a list of A, B, C, or D, "or" indicates that a selection from the list could be A, B, C, and D, or A and B, or A and C, or B and D, or just A, just B, just C, just D, and so on. The exclusive sense of "or" will be explicitly pointed out or be clearly identifiable in the context of a description. The exclusive sense of "or" refers to a meaning of "or" whereby a list of A, B, or C indicates that selection of one item excludes the others. That is, for example, if A is selected, then B and C are excluded from the selection.

As used here, computer program source code ("code") is to be understood as a set of instructions for use with a computing device. The term "document" includes a computer file having code. The term "version control system" ("VCS") will be used here to refer to a generic system commonly used to manage ongoing development of digital documents like code and other projects that may be worked on by a team. The term "commit" refers to making, or issuing a request to make, permanent a set of changes to a document.

As used here, the term "method" has generally the same meaning as understood in the context of objected-oriented computer programming languages; however, the term "method" as used here more particularly also refers to an identifiable subroutine (or particular computer program code) that is associated with other computer program code (for example, other subroutines) in typically a larger computer program, such as an application. A method usually consists of a sequence of statements to perform an action, a set of input parameters to customize those actions, and possibly an output value. The term "file" refers to a collection of related data records (as for a computer). The meaning of "file" also includes a complete collection of data (as text or a program) treated by a computer as a unit especially for purposes of input and output. In general, inventive embodiments described here relate to portions of a file or to methods, which methods are part of a larger collection of computer source code.

As an example of one application of the association of workflow(s) with code sections, consider the issue of authorization of revisions in a VCS. Known VCS authorize revisions at the file level. However, since a file can be of any length, the file can be too arbitrary a distinction to determine what portion of the code in a file is to be protected from unauthorized revision. In contrast, an inventive embodiment disclosed here provides for authorization for committing code at the method level. Some method implementations may be of critical importance or require expert knowledge for revisions. In such cases, even a minor change could potentially disable the functionality of a method. Hence, in those circumstances, authorization might be desired so that verification can be done before a modified method is committed.

Disclosed herein is a VCS configured to interpret annotations in source code to initiate workflow(s), for example, a workflow implementing revision control. In such an embodiment, the annotations can identify an author of the code and provide information on one or more persons (which can include all users) having authorization to revise the code. Furthermore, when a commit without authorization to update the code is attempted, a notification is sent to an agent authorized to commit in order to accept or reject the change. Additionally, the annotations can include instructions to, for example, generate a workflow when a modification to the code is successfully committed or when an attempted commit of a modified file fails. In some embodiments, the workflow can be an e-mail notification. In other embodiments, the workflow can involve a manual authorization procedure.

In one embodiment, code annotation is provided, and the code annotation is interpreted by the VCS as identifying authorizations to revise the code. In another embodiment, a workflow is generated whereby code is allowed to be checked in as permitted by code annotations. In yet another embodiment, workflows are generated that are associated with adding or changing authorization annotations.

Figure 5:
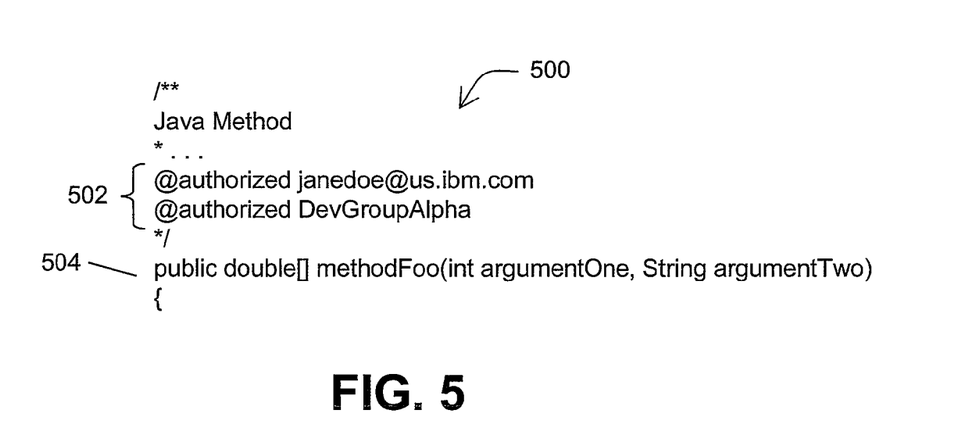
FIG. 5 is an exemplary inventive data structure that can be used with the disclosed embodiments.

In one embodiment, source code annotations describe who can access the code or make revisions to the code. In one example, a Java @authorized tag or similar is provided. The semantics of the tag can be any suitable ones. The tag is preferably embedded in the source code. In some embodiments, an authorized agent is identified by an e-mail address. Other ways of identifying a user, group, or role include pseudonyms, identifiers, and full names. Other tags or attributes on tags might include specific access information such as read only, no read, no write, encryption information, and workflow description. FIG. 5 provides an example of annotated code. In the example shown, jandoe@us.ibm.com and DevGroupAlpha (users, roles, or groups) are allowed to make changes to the method methodFoo 504.

In one implementation, to determine the initial authorization for a creation of a method, a hierarchy authorization might exist. For example, certain roles are able to perform all actions. If there is no explicit method authorization, the system defaults to the class, file, package, or project authorizations. Some of these authorizations can be explicitly noted with code annotations. When there are no files or code describing the sections, like for projects, the annotations can be stored in metadata.

In use, if there is no revision authorization and a commit is made, a workflow is generated to obtain the necessary authorization. This can be an e-mail notification to the authorized agent to commit; the notification can include a link to an interface to allow the change to be committed. The code that is awaiting authorization can be stored in a temporary storage location on the server side or can be requested from the client in the future. The workflow can also be a notification of a change at the same granular level. Another workflow can be triggered when an attempt is made to change the authorization annotations. This workflow checks to see if there is authorization to make changes to the annotations.

By way of example, a standard java source file (say, MyClass.java) is checked out of an annotation-enabled VCS repository. An annotation such as @authorized "johndoe@example.com" is added to a method aMethod( . .

. ), and the file is committed to the VCS. Subsequently, an agent (e.g., janewilson@example.com) checks out MyClass.java and makes changes, including some revisions to aMethod( . . . ). When the revising agent tries to commit, the revising agent is notified that the changes to the method are not authorized, and the changes are not checked in. These and other features of various inventive embodiments will now be described in farther detail with reference to FIGS. 1-5.

Figure 1:
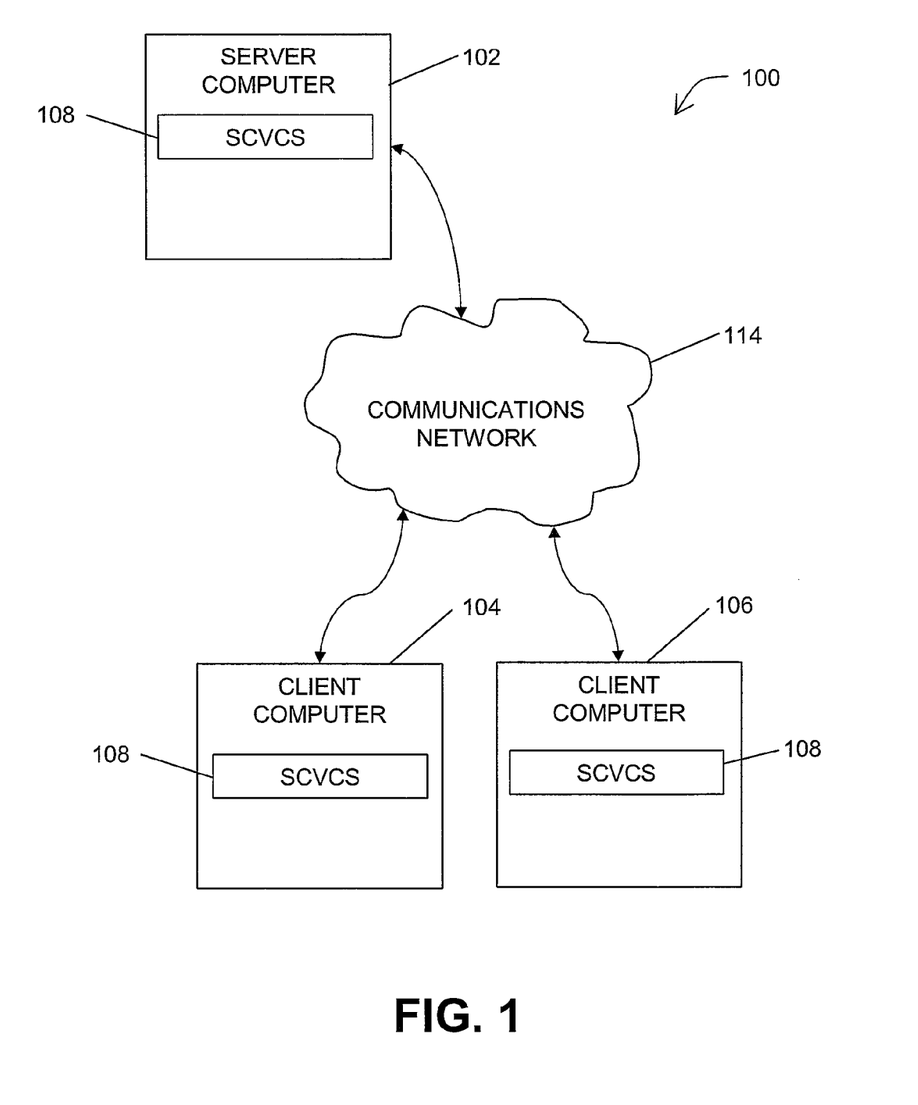
FIG. 1 is a high level schematic diagram of a networked computing environment configured with hardware and software components for implementing the described embodiments.

FIG. 1 illustrates a networked computing environment 100, in which embodiments of the invention can be implemented. Networked computing environment 100 includes server computer 102, client computer 104, and client computer 106 in communication between and/or among each other via communications network 114. Communications network 114 can be one or more cooperating networks of computers, telephone signals switching stations, satellite links, cellular phone towers, etc., configured to receive, transmit, and deliver data signals between and/or among server computer 102, client computer 104, and client computer 106. In one embodiment, communications network 114 is the Internet, which is a worldwide collection of networks and gateways that utilize the Transmission Control Protocol/Internet Protocol (TCP/IP) suite of protocols to communicate with one another. In other embodiments, communications network 114 can be a virtual private network, intranet, local area network, wide area network, etc.

Server computer 102, client computer 104, and client computer 106 can be any computing devices capable of transmitting and receiving communication signals. In a preferred embodiment, server computer 102, client computer 104, and client computer 106 are personal computing devices such as laptops, desktops, etc. In one embodiment, server computer 102 is a computing device such as data processing system 200 illustrated in FIG. 2. In other embodiments, server computer 102, client computer 104, or client computer 106 can be a mobile, wireless device including, but not limited to, a mobile telephone, cellular phone, radio phone, personal digital assistant, smart phone, etc. Preferably, at least one of server computer 102, client computer 104, and client computer 106 includes source code version control system (SCVCS) 108, which will be described further below. While FIG. 1 depicts one server computer 102 and two client computers 104, 106, it should be understood that networked computing environment 100 can include multiple server computers 102 and more than two client computers 104, 106. Alternatively, networked computing environment 100 can include a plurality of peer computers, one or more of which may implement SCVCS 108. For simplicity of description, reference will be made only to client (or peer) computer 104; it be understood that any description involving client computer 104 is applicable also to client (or peer) computer 106.

In one implementation, SCVCS 108 is provided in one or more of server computer 102 and/or client computer 104. It is to be understood that in some embodiments the structure and functionality of SCVCS 108 can be distributed between or among the server computer 102 and client computer 104. In one embodiment, client computer 104 accesses source code of a computer program stored in or provided by server computer 102. Changes are made to the source code and a commit indication is received. The source code is queried to determine if there is at least one authorization tag that indicates authorization for revision of a specific portion of the code. If the authorization exits, the commit indication is accepted and a new version of the computer program is created and stored in server computer 102. However, if no authorization is found in annotations in the source code, the commit indication is not accepted. Moreover, in some embodiments, upon an attempt to commit and an indication that there is not authorization for the attempted commit, a notification is sent regarding the failed attempt to commit. In some implementations, annotations can be used to provide instructions to generate workflows, such as providing an e-mail notification when a modification to a document is attempted to be committed, successfully committed, and/or fails to commit.

Figure 2:
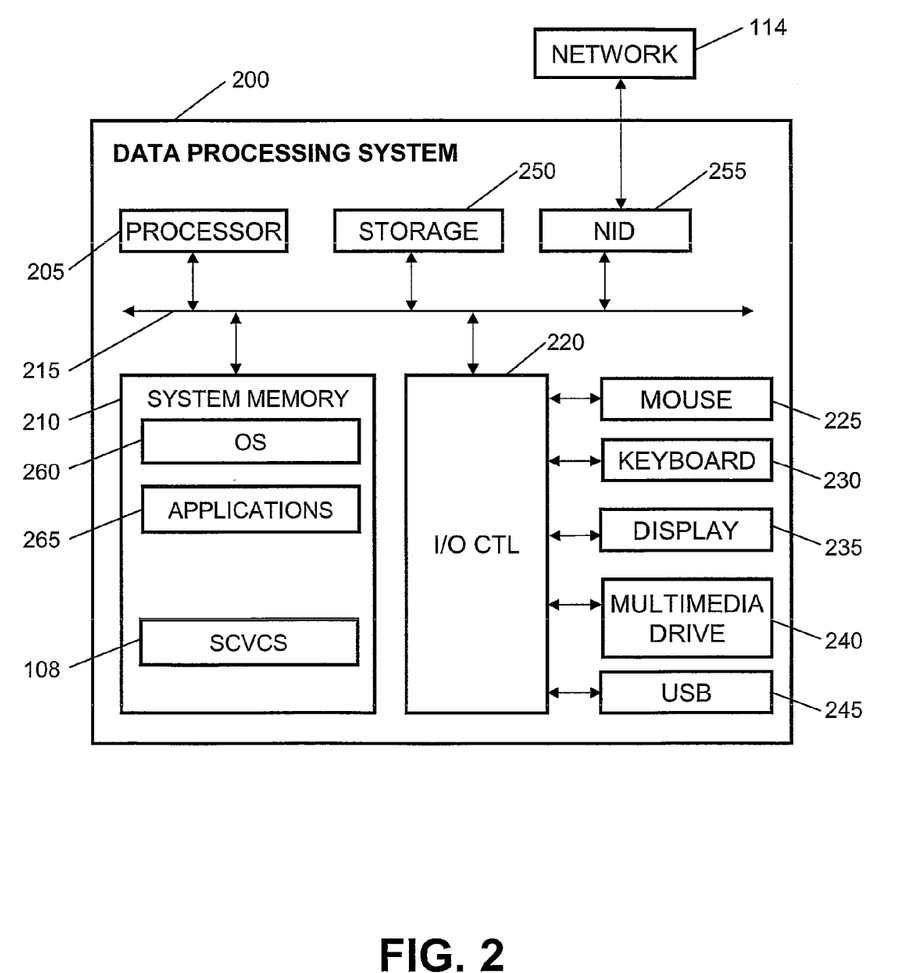
FIG. 2 is a block, schematic diagram of a data processing system that can be used in the networked computing environment of FIG. 1.

Turning to FIG. 2 now, a block diagram of a data processing system 200 is depicted. Data processing system 200 is an exemplary computing device that can be used as server computer 102, client computer 104, or client computer 106. In one embodiment, data processing system 200 includes at least one processor or central processing unit (CPU) 205 connected to system memory 210 via system interconnect/bus 215. System memory 210 is a lowest level of memory, and may include, for example, DRAM, flash memory, or the like. Of course, data processing system 200 may include additional volatile memory, including, but not limited to, cache memory, registers, and buffers. Also connected to system bus 215 is I/O controller 220, which provides connectivity and control for input devices, of which pointing device (or mouse) 225 and keyboard 230 are illustrated, and output devices, of which display 235 is illustrated. Additionally, a multimedia drive 240 (for example, CDRW, or DVD drive) and USB (universal serial bus) hub 245 are illustrated, coupled to I/O controller 220. Multimedia drive 240 and USB hub 245 may operate as both input and output (storage) mechanisms. Data processing system 200 also comprises storage 250, within which data, instructions, or code may be stored. Network interface device (NID) 255 can be coupled to system bus 215. NID 255 enables data processing system 200 to connect to one or more access networks, such as communications network 114.

Those of ordinary skill in the relevant technology will appreciate that the hardware and basic configuration depicted in FIGS. 1-2 may vary. For example, other devices or components may be used in addition to or in place of the hardware depicted. The depicted example is not meant to imply architectural limitations with respect to the present invention.

In addition to the above described hardware components of data processing system 200, various features can be completed via software (or firmware) code or logic stored in system memory 210 or other data storage (for example, storage 250) and executed by CPU 205. In one embodiment, data, instructions, and/or code from storage 250 populates system memory 210. Thus, system memory 210 can include software or firmware components, such as operating system (OS) 260 (for example, Microsoft Windows®, GNU®, Linux®, or Advanced Interactive eXecutive (AIX®)), various other software applications 265, and SCVCS 108.

In actual implementation, SCVCS 108 may be combined as a single application collectively providing the various functions of each individual software component when CPU 205 executes the corresponding code. For simplicity, SCVCS 108 is illustrated and described as a stand alone or separate software/firmware component, which is stored in system memory 210 to provide or support the specific novel functions described herein. In some embodiments, however, components or code of OS 260 may be combined with that of SCVCS 108, collectively providing the various functional features of the invention when the CPU 205 executes the corresponding code.

In certain embodiments, CPU 205 executes SCVCS 108 and OS 260, which supports the user interface features of SCVCS 108. It is noted that, depending on the specifics of any given configuration, each of compute server 102 and client computer 104 can be provided with a general computing architecture based on data processing system 200. However, the hardware and/or software functionality comprised by server computer 102 and client computer 104 can be customized for a specific user, use, or environment.

As will be particularly described below, in one embodiment, at least one of server computer 102 and/or client computer 104 is provided with SCVCS 108 for facilitating version control of computer program source code. To support such version control, SCVCS 108 can include computer program code for: (a) annotating a portion of a computer program source code to indicate at least one authorization for revisions to a first version of the computer program source code; (b) monitoring the computer program for revisions to the portion of computer program source code; (c) in response to a request to commit a revision to the portion of the computer program source code, evaluating the at least one authorization to determine whether there is an authorization for the revision; (d) in response to a determination that there is authorization for the revision, allowing the commit of the revision to the portion of the computer program source code; generating a workflow indicating that a commit of the revision to the portion of code has been successfully committed. Depending on the specific embodiment, SCVCS 108 can include some or all of the listed code functions (a)-(d). Additionally, SCVCS 108 can include program code to support additional workflow(s), as discussed further below. According to the illustrative embodiment, when CPU 205 executes SCVCS 108, data processing system 200 initiates a series of processes that enable the above functional features as well as additional features or functionality, which are described below within the description of FIGS. 3-5.

Figure 3:
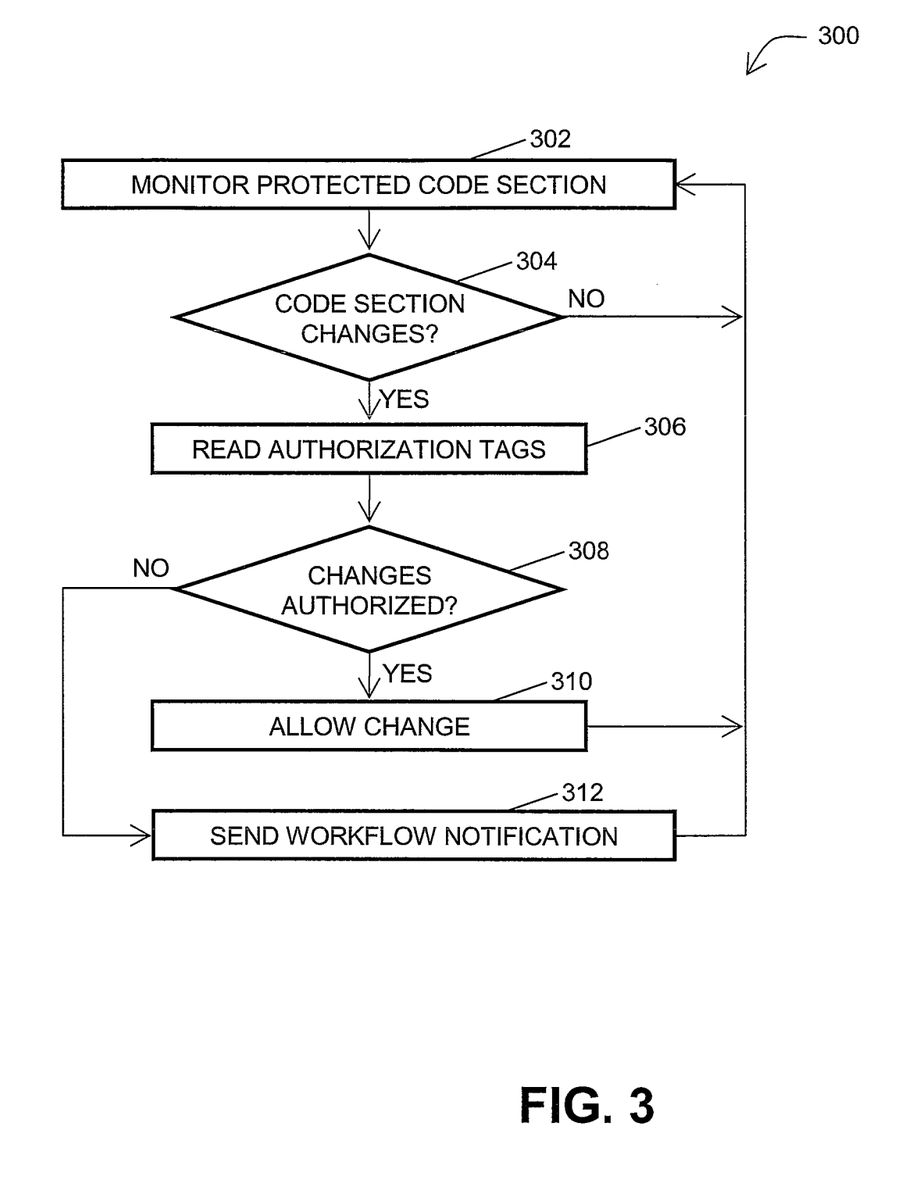
FIG. 3 is a flow chart of a process by which certain functionality of one disclosed embodiment can be implemented.
Figure 4:
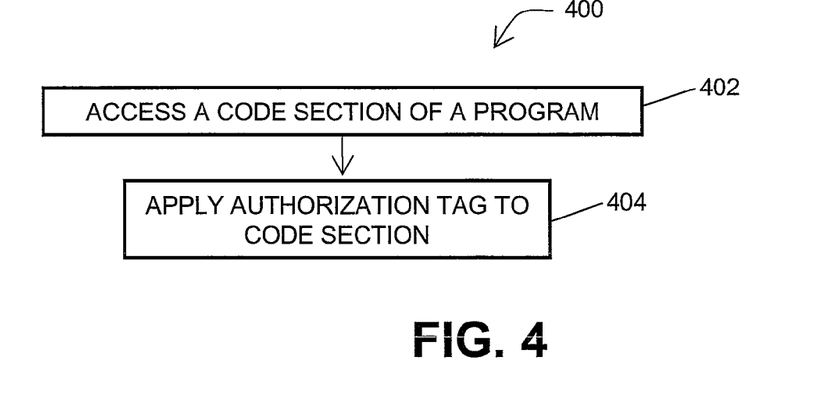
FIG. 4 is a flow chart of another process that can be used to implement certain functionality of the disclosed embodiments.

With reference now to FIG. 3, process 300 that can be implemented in networked computing environment 100 and data processing system 200 will be described. In one embodiment, process 300 facilitates version control of computer program source code. A section or portion of code of a computer program source code (e.g., a method) is monitored for revisions thereto (302). If there are no changes to the code section (304), monitoring is continued (302). If a commit request is received with revisions (304) to the code section being monitored, the code section is evaluated by reading authorization tags embedded in the code section (306). FIG. 4 shows process 400 by which a code section is accessed (402) and authorization tags are embedded in the code section (404). Process 400 is completed to produce the annotated code section used in process 300. FIG. 5 shows exemplary code section 500 in which authorization tags 502 are included for version control of computer program method 504 (such as the exemplary Java method "methodFoo").

Based on evaluating the authorization tags, SCVCS 108 determines whether the changes are authorized (308). If the changes are authorized, the changes are committed (310), and the code section monitoring continues (302). In one embodiment, a determination that the changes are authorized is based on authorization tags 502 matching at least one identifier of the agent attempting to commit the revision. However, if the changes are not authorized, a notification is sent (312) indicating that there has been an unauthorized attempt to make changes in the code section being monitored. Monitoring of the code section can be resumed (302). It should be noted that authorization tags 502, or similar annotations, can be used to generate workflows. In some embodiments, authorization tags 502 can include instructions to generate a workflow when a modification to code section 500 is attempted to be committed, successfully committed, and/or fails to commit. In some embodiments, the workflow can be an e-mail notification. In other embodiments, the workflow can involve a manual authorization procedure, for example.

It should be understood that the association of code sections with workflows to facilitate version control is but one possible application of the techniques disclosed herein. Other exemplary workflows can automatically regenerate a portion of the code (e.g., a method), provide a notification to one or more persons or groups, update a issue tracking system, update a business dashboard, etc. Further, it should be understood that the workflow that is to be initiated or "fired" need not be associated (e.g., by code annotation or metadata) with a target portion of the code, but can alternatively be associated with a calling or referencing portion of code. In this case, the semantic model of how the code gets called is used to determine whether a workflow needs to be fired based upon the association of the workflow with the referencing portion of code.

In the flow charts and/or functional block diagrams above, one or more of the methods can be embodied in a computer writable and/or readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable and writable storage media such as fixed (hard) drives, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

While the invention has been described with reference to exemplary embodiments, it will be understood by those skilled in the relevant technology that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of providing version control for computer program source code in a data processing system, the method comprising:
    in response to a request to commit a revision to a portion of a computer program source code, a processor of the data processing system determining whether the revision is authorized by the processor evaluating at least one annotation in the portion of the computer program source code for an authorization in the annotation for the revision to the portion of the computer program source code, wherein:
        the authorization comprises a tag identifying one or more users;
        the authorization is limited to less than all of the computer program source code to which the portion belongs;
        the portion of the computer software program code is a target portion of the computer program source code;
    in response to a determination that the revision is authorized based on evaluation of the annotation of the portion of the computer program source code, the processor allowing commitment of the revision to the portion of the computer program source code in a protected version of the computer program source code; and
    the processor determining a workflow to be initiated by a version control system in response to determining whether the revision is authorized and thereafter initiating the workflow by the version control system, wherein the determining includes determining the workflow based on a calling portion of the computer program software code that references the target portion, wherein the determined workflow includes transmission of a workflow notification that updates a business dashboard, wherein initiating the workflow includes:
        in response to a determination based on evaluation of the annotation that the revision has not been authorized, the processor transmitting the workflow notification to a destination specified in the annotation, wherein the workflow notification notifies of an attempt to commit the revision to the portion of the computer program source code.

2. The method of claim 1, wherein initiating the workflow includes:
    in response to the processor allowing commitment of the revision to the portion of the computer program source code, generating a workflow notification that updates an issue tracking system.

3. The method of claim 1, further comprising generating a workflow notification in response to an attempt to change an authorization annotation within the computer program source code.

4. The method of claim 1, wherein the portion of the computer program source code is a Java method of the standard Java source file.

5. The method of claim 1, wherein transmitting the workflow notification of an attempt to commit the revision to the portion of the computer program source code comprises transmitting a request for authorization to commit the revision to a party having authorization to commit the revision to the protected version of the computer program source code.

6. The method of claim 1, wherein initiating the workflow includes:
    in response to a determination based on evaluation of the annotation that the revision has not been authorized, the processor transmitting the workflow notification, wherein the workflow notification notifies of an attempt to commit the revision to the portion of the computer program source code.

7. A data processing system, comprising:
    a processor and a computer program storage coupled to the processor;
    an annotated computer program stored in the computer program storage, wherein the annotated computer program includes annotations associated with a portion of computer program source code of the computer program, the annotations indicative of at least one authorization for revisions to the portion of the computer program source code;
    version control system stored within the computer program storage and executable by the processor to control updates to the computer program source code of the annotated computer program, wherein the version control system, when executed by the processor, causes the data processing system to perform:
        in response to a request to commit a revision to the portion of the computer program source code, determining whether the revision is authorized by the version control system evaluating at least one annotation in the portion of the computer program source code for an authorization in the annotation for the revision to the portion of the computer program source code, wherein:
            the authorization comprises a tag identifying one or more users;
            the authorization is limited to less than all of the computer program source code to which the portion belongs;
            the portion of the computer software program code is a target portion of the computer program source code;
        in response to a determination that the revision is authorized based on evaluation of the annotation of the portion of the computer program source code, the version control system allowing commitment of the revision to the portion of the computer program source code in a protected version of the computer program source code; and
        determining a workflow to be initiated by the version control system in response to determining whether the revision is authorized and thereafter initiating the workflow by the version control system, wherein the determining includes determining the workflow based on a calling portion of the computer program software code that references the target portion, wherein the determined workflow includes transmission of a workflow notification that updates a business dashboard, wherein initiating the workflow includes:
            in response to a determination based on evaluation of the annotation that the revision has not been authorized, the version control system transmitting the workflow notification to a destination specified in the annotation, wherein the workflow notification notifies of an attempt to commit the revision to the portion of the computer program source code.

8. The version control system of claim 7, wherein the version control system, when executed, further causes the data processing system to generate a workflow notification in response to an attempt to change an authorization annotation within the computer program source code.

9. The version control system of claim 7, wherein the portion of the computer program source code is a Java method.

10. The version control system of claim 7, wherein transmitting the workflow notification of an attempt to commit the revision to the portion of the computer program source code comprises transmitting a request for authorization to commit the revision to a party having authorization to commit the revision to the protected version of the computer program source code.

11. The data processing system of claim 7, wherein initiating the workflow includes:
in response to a determination based on evaluation of the annotation that the revision has not been authorized, the processor transmitting the workflow notification, wherein the workflow notification notifies of an attempt to commit the revision to the portion of the computer program source code.

12. An article of manufacture, comprising:
a computer memory;
instructions stored within the computer memory, wherein the instructions are readable and executable by a machine to cause the machine to perform:
in response to a request to commit a revision to a portion of a computer program source code, a version control system determining whether the revision is authorized by the version control system evaluating at least one annotation in the portion of the computer program source code for an authorization in the annotation for the revision to the portion of the computer program source code, wherein:
the authorization comprises a tag identifying one or more users;
the authorization is limited to less than all of the computer program source code to which the portion belongs;
the portion of the computer software program code is a target portion of the computer program source code;
in response to a determination that the revision is authorized based on evaluation of the annotation of the portion of the computer program source code, the version control system allowing commitment of the revision to the portion of the computer program source code in a protected version of the computer program source code; and
determining a workflow to be initiated by the version control system in response to determining whether the revision is authorized and thereafter initiating the workflow by the version control system, wherein the determining includes determining the workflow based on a calling portion of the computer program software code that references the target portion, wherein the determined workflow includes transmission of a workflow notification that updates a business dashboard, wherein initiating the workflow includes:
in response to a determination based on evaluation of the annotation that the revision has not been authorized, the version control system transmitting the workflow notification to a destination specified in the annotation, wherein the workflow notification notifies of an attempt to commit the revision to the portion of the computer program source code.

13. The article of manufacture of claim 12, wherein initiating the workflow includes:
in response to allowing commitment of the revision to the portion of the computer program source code, generating a workflow notification that updates an issue tracking system.

14. The article of manufacture of claim 12, further comprising instructions, that when executed by the machine, cause to machine to generate a workflow notification in response to an attempt to change an authorization annotations within the computer program source code.

15. The article of manufacture of claim 12, wherein the portion of the computer program is a Java method of the standard Java source file.

16. The article of manufacture of claim 12, wherein transmitting the workflow notification of an attempt to commit the revision to the portion of the computer program source code comprises transmitting a request for authorization to commit the revision to a party having authorization to commit the revision to the protected version of the computer program source code.

17. The article of manufacture of claim 12, wherein initiating the workflow includes:
in response to a determination based on evaluation of the annotation that the revision has not been authorized, the processor transmitting the workflow notification, wherein the workflow notification notifies of an attempt to commit the revision to the portion of the computer program source code.

* * * * *